July 13, 1965 B. D. EYTINGE 3,194,664
METHOD FOR CONTINUOUSLY PRODUCING NIXTAMAL
Filed May 19, 1960 3 Sheets-Sheet 1
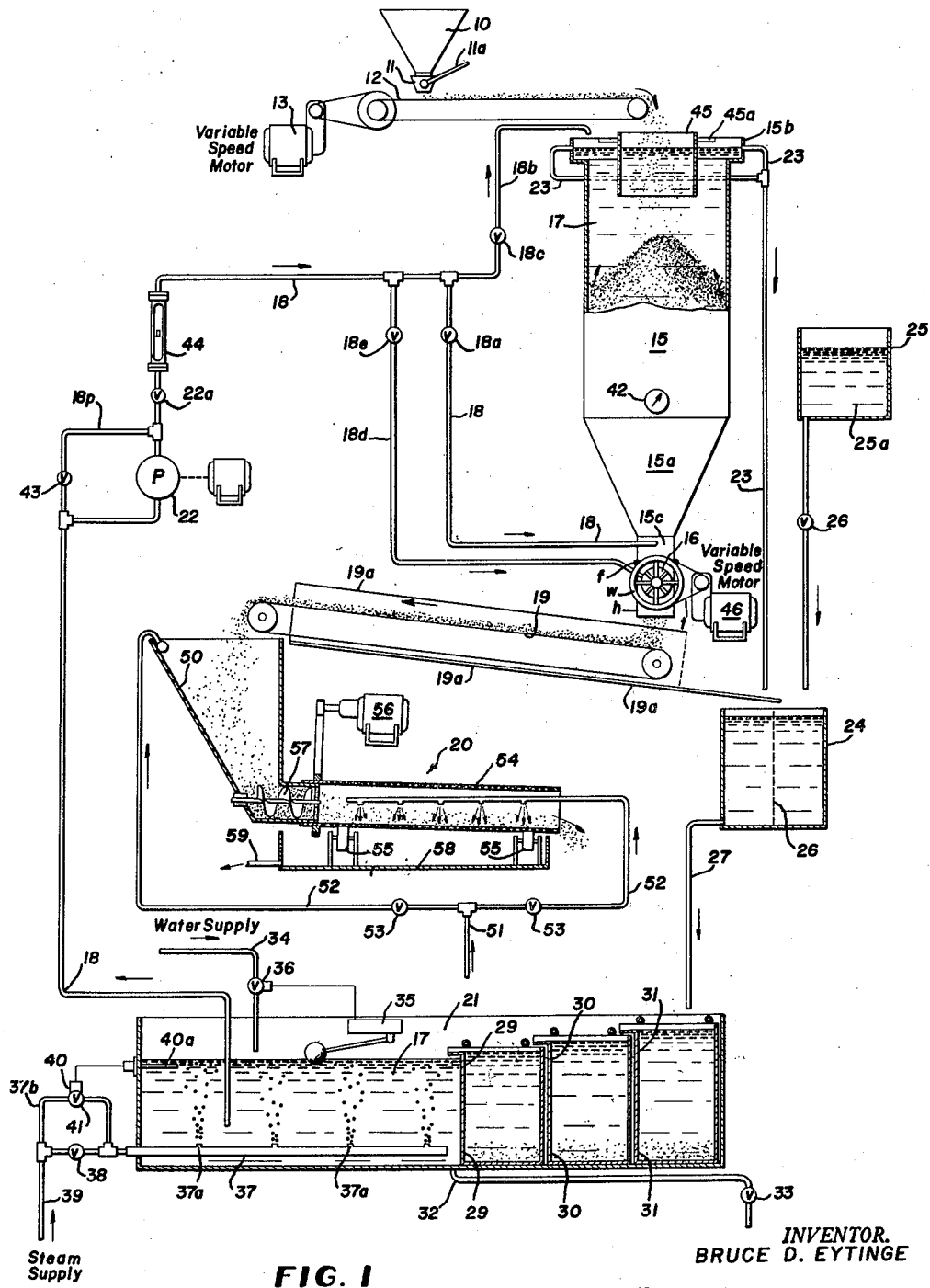
FIG. 1
INVENTOR.
BRUCE D. EYTINGE
BY 
ATTORNEY

INVENTOR.
BRUCE D. EYTINGE

ATTORNEY

United States Patent Office 3,194,664
Patented July 13, 1965

3,194,664
METHOD FOR CONTINUOUSLY PRODUCING NIXTAMAL
Bruce D. Eyfinge, near San Antonio, Tex., assignor to The Frito Company, Dallas, Tex., a corporation of Texas
Filed May 19, 1960, Ser. No. 30,366
10 Claims. (Cl. 99—80)

The invention relates to an improved method and apparatus for processing continuously whole corn kernels—as distinguished from batch processing—in preparing nixtamal which is useful in the making of masa (a cornmeal dough) for either corn-chips or tortillas or in the making of tortilla flour.

Nixtamal is a word derived from the Mexican language and designates corn kernels which have been processed, by cooking and/or soaking before milling, in a manner that imparts the proper characteristics to the masa for the particular food product to be prepared from or with it.

In the production of finished nixtamal, which is ready for grinding—particularly for corn-chip masa—it is most desirable that the nixtamal should have a moisture content of between 50 to 52% (by weight), being devoid of all its outer hulls except for a very small quantity (in the order of less than 5% by weight) to give the end product the desired flavor, and the remaining constituents of the kernels being soaked so that there are no white centers of starch as they appear as white specks in the finished corn-chip and are undesirable.

Because of the hard and tough characteristic of dried corn-kernels and their outer hulls and aleuronic layer, there have been generally two ways of preparing nixtamal heretofore, which may be briefly stated as:

(1) Heating a quantity of corn kernels in water and lime, as a batch, to approximately 80 degrees centigrade (176° F.), then discontinuing the heating and allowing the entire batch to cool slowly for a period of approximately 18 hours, then removing the corn kernels to a washer, the action of which removes the outer hull or hash of the kernels, the kernels then being ready to be milled into masa upon being discharged or conveyed from the washer. By controlling the amount of water added during the milling, a tortilla masa or corn-chip masa may be produced. However, this manner of producing nixtamal is not too suitable or readily adaptable for making the best corn-chip type of masa because the amount of absorption cannot be controlled very closely for the reason that as the temperature of the batch falls slowly, during the cooling step, to that approaching room temperature, three things take place: (a) the outer hulls of the kernels are loosened, (b) water is absorbed unevenly through the kernels and (c) the constituents in the kernels are only partially hydrolyzed as this hydrolyzing occurs only in the initial stage of heating to 80° C. It is very difficult to control the total amount of moisture absorption and its total amount is quite important, controlling the characteristic of the resulting masa. And:

(2) A batch of corn kernels is first heated in an agitated steam-jacketed kettle, containing an aqueous solution of calcium hydroxide, and boiled from 5 to 20 minutes, depending upon the degree of agitation, the size of the kettle, and the type of corn used; then, when the proper gelatinization has been formed through moisture absorption by the constituents of the kernels, the contents of the kettle are discharged into a large open tank or vat; and water, at its normal temperature, is stirred into the batch in the vat to reduce its temperature to approximately 70° C. (or about 160° F.); and then the batch is allowed to stand and cool for a period from 8 to 12 hours. During this cooling period little moisture absorption occurs and the gelatinization was established by close control during the cooking in the kettle. However, during this standing and cooling period, the outer hulls of the kernels are loosened further, the aleuronic layer of the kernels is softened, and water is absorbed slowly and more evenly throughout the remaining starch in the kernels than in said first example above stated. While this manner of preparing nixtamal is more suitable for the production of corn-chip masa because of its closer control of the amount of hydrolyzation of the constituents of the kernels in a two-stage system, it is slow and costly in labor and equipment and in the manipulation of mobile equipment and requires a large floor area for maneuvering and storing of said equipment, particularly of said soaking vats, in a production system and the mobile equipment becomes quickly damaged resulting in frequent replacement.

Also, heretofore, some of the above mentioned steps have been mechanized to some degree and the moisture content of the nixtamal at or from the grinding mills has been substantially reduced to provide a normally dry flour, but this mechanization still, so far as I have knowledge, processes the corn kernels in batches rather than in a continuous step or flow.

Among the difficulties encountered, when processing corn kernels and the like in batches, are those of controlling the quality of the nixtamal produced therefrom because (1) of the uneven distribution of temperature from batch to batch, (2) of the uneven solid content of the solution employed resulting in variations of its pH number and (3) the difficulties of handling large individual batches required to maintain a constant production with its attendant high labor costs, greater space area requirement for equipment and for maneuvering the same.

The main object or aim of the present invention is to overcome the above mentioned, as well as other, drawbacks and to process corn kernels, and the like, for the preparation of nixtamal in a greatly reduced period of time with greater control of the moisture content and with a greater percentage and more uniform hydrolyzation of the constituents of the resulting nixtamal so that the end product—i.e. corn-chips, tortillas or tortilla flour—will have the desired properties and uniform characteristics for that product.

Briefly, this is accomplished by continuously feeding a measured amount of cleaned corn kernels into the upper end of a stationary tank containing a heated processing water solution of a pH higher than ten while this solution is being introduced, under pressure and at the proper temperature, into the bottom portion of the tank and flows upwardly in the tank through the kernels, which have collected by gravitation therein, and, after a period of time from the commencement of the process, continually and gradually discharging said kernels from the bottom of the tank at a controlled rate—in relation to the feeding of kernels into said tank—and in a condition whereby the husks may be removed from said kernels by an aqueous washing step. Thereafter the corn kernel is then ready for milling into masa, which may be then shaped and cooked in the conventional manner.

Other objects and advantages of the present invention will be apparent as the following detailed description of the same proceeds.

To practice the present invention, use of certain instrumentalities may be employed, of which several are shown in the accompanying drawings and form part of this invention and wherein:

FIGURE 1 is a schematic illustration of one arrangement of instrumentalities that may be employed to produce nixtamal according to this invention;

Figure 2:
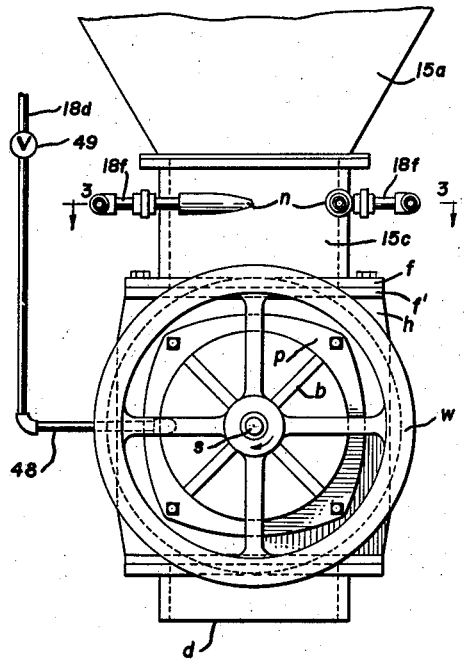
FIGURE 2 is an enlarged fragmentary end elevational view of the lower end of the corn treating tank illustrating the discharge gate-valve.

In carrying out this invention, the corn kernels are prepared preliminarily, in the usual manner of processing nixtamal, by cleaning the kernels to eliminate foreign matter and to remove broken or cracked kernels—the less the better. After cleaning and at some time before using the kernels, they are stored in a storage elevator to equalize their moisture content; and, in the preparation of kernels for corn-chips, a blend of about ⅓ yellow corn and about ⅔ white corn is stored in said elevator.

When the production of nixtamal is to begin, the stored corn kernels are fed from the elevator to a hopper 10 equipped with an adjustable gate 11 at its discharge end through which the kernels are fed onto an endless conveyor 12, this being adjustably controlled by means of the handle 11a. The conveyor 12 is driven by a variable speed drive 13 so that a continuous and controllable quantity of kernels may be fed into the processing tank 15, which is, preferably, a vertical elongated cylinder having a diameter about ⅔ of its length with its upper end open and the lower ⅓ of its length forming an inverted hollow frusto-cone 15a, at the open bottom end of which is a discharge gate or valve 16. The configuration of the conical portion 15a of the tank 15 has been chosen in order to effect uniform downward movement of the kernels in the tank toward the valve or gate 16 and, from experimentation, the length of the conical portion 15a should be equal to the diameter of the tank 15 in order to effect the desired movement of the kernels.

Initially, the tank 15 is filled with the treating solution 17 at the proper treating temperature and pH, which is introduced therein at its top end through a branch 18b of a supply pipe 18. The supply pipe 18 extends from a make-up tank 21 and is connected into the bottom of the treating tank 15 directly above the valve or gate 16; and, when filled, the valve 18c in said branch 18b is closed and the valve 18a in the supply pipe 18 is open to deliver the treating solution, under pressure, to the bottom of the treating tank 15. The processing commences by continuously feeding the kernels from the conveyor 12 into the top of the tank while the processing solution continues to be supplied, at a temperature about 80° C. and under pressure, to the treating tank 15 and flows upwardly through or around the mass of corn kernels that have accumulated within the tank. The solution overflows the tank 15 and is collected and passed through a filtering, a heating, and a pH control means (24–21–25) and then returned to the supply pipe 18 by a pump 22 for reuse. This treating solution flows in the treating tank 15 in a direction opposite to the movement of the kernels within said tank in order to keep the kernels from packing tightly therein, as they expand during the time their moisture content is increasing, and further provides a continuing flow of fresh solution (at the proper temperature, at the proper pH and proper solid content) moving upwardly into contact with the kernels to effect a more even and progressive processing of all the kernels.

Under these conditions, the hulls of the corn kernels are hydrolyzed and loosened from the next contiguous or aleuronic layer of the kernels, thus allowing the water to soften the aleuronic layer and to more readily penetrate in the starch cells or sacks. At the completion of this action, the distribution of the moisture within each kernel, at the bottom of the tank 15 adjacent the discharge valve or gate 16, is uniform throughout the kernel—i.e., there are no white centers in the kernels—and their moisture content is between about 50 to 52%. This is achieved by bringing the corn kernels into contact with the treating solution moving relative to the kernels and maintained at a substantially uniform elevated temperature of about 80° C. (i.e. 176° F.) and at a controlled pH of above 10, preferably, at 11 to 12.4 as an optimum.

When the kernels at the bottom portion of the tanks are in the condition, just stated, the gate valve 16 is operated to discharge the kernels upon a foraminous endless conveyor 19 which allows the treating solution to drain from the kernels and which delivers the kernels to a conventional corn washer 20, the action of which removes the already loosened hulls from the kernels, to produce the nixtamal. Since the kernels are being continuously fed into the tank 15 from conveyor 12, the action of the solution on the kernels continues while the accumulated mass within the tank 15 traverses the length of the tanks, and that portion of the mass near or at the bottom of the tank 15 is ready to be controllably and continuously discharged by the gate valve 16.

With corn kernels having an initial moisture content of approximately 13% and relatively soft characteristics, the processing of the kernels to a condition, just stated, may be accomplished in aproximately five hours, as against eight to ten hours with the prior process (b) stated in the forepart of this specification, and with less equipment, with less floor-area and with less labor and, at the same time, producing a better nixtamal. The nixtamal, so produced, has a moisture content of about 50.2, after washing and removing the outer hulls, and the amount of gelatin formed, under the conditions of this process, is correct for extruding the masa, made for this nixtamal, into corn-chips. The flavor and color of the corn-chips is good and the oil content, after frying in the conventional manner, is about 36%. If the corn kernels are of a hard variety, such as grown in Texas, but with the same moisture content, then to obtain the desired condition of the kernels, just stated, the processing may require as long as seven hours to properly soften the horny portion of the kernel and obtain proper moisture content of the entire kernel, as against 10 to 12 hours by prior process (b) mentioned above.

I have found that, if the pH of the treating aqueous solution 17, is less than 10, it takes too long to loosen the outer hulls of the kernels and the speed of water penetration into the kernels is reduced. The optimum pH of 11 to 12.4 can be easily obtained if calcium hydroxide is used because it is not very soluble in hot water, and the hot water will dissolve only a sufficient quantity of the calcium hydroxide at the processing temperature of 80° C. as to readily maintain the optimum pH. Most of the calcium hydroxide is absorbed in the hulls as they are loosened from the kernel but, after the hulls have been washed from the treated corn kernels in the washer 20 and the kernels have been milled into masa, the resulting pH may be less than seven.

Calcium hydroxide is not the only chemical that can be used in this process. Sodium hydroxide or potassium hydroxide will serve as well; however, since they are more soluble in water than calcium hydroxide, they do not lend themselves to as easy preparation of a solution having the desired pH. Sodium bicarbonate, trisodium phosphate, sodium carbonate, sodium sesquicarbonate, tetrasodium pyrophosphate, sodium tripolyphosphate, and many other chemicals may be used to raise the pH sufficiently to loosen the outer hulls to increase water penetration, but considerable care must be taken in the preparation of the proper strength of such solutions; and, also, a difficulty is sometimes encountered in washing the nixtamal so as to remove these other chemicals that might have an effect on the flavor of the finished product.

The processing solution 17 is supplied to the pipe 18 from a main makeup tank 21 by means of a pump 22 interposed in the pipe-line 18. The overflow from the top of the tank 15 is taken off by drain pipes 23 which discharge in a primary settling sump 24. The sump 24 may also be, and preferably is, positioned to receive the solution drained by the treated kernels on the conveyor belt 19 by means of a trough 19a, or the like, disposed under the said conveyor and discharging into the sump 24. A tank 25, containing a supersaturated aqueous solution of calcium hydroxide 25a, is positioned to constantly discharge a metered quantity of said solution through valve 26 into the settling sump 24. The sump 24 has an outlet 27 on the discharge side of a filtering screen 28 in the sump 24 and discharges in one end of the makeup tank 21 remote from the inlet end of solution supply pipe 18, which extends into the opposite end of the makeup tank 21.

A series of contiguously disposed settling tanks 29, 30 and 31 are removably fitted into the end of the makeup tank 21 adjacent the discharge 27 from the sump 24 so that the latter discharges into the out-board settling tank 31, from which it overflows into the adjacent tank 30, which overflows into the next tank 29, which in turn overflows into the main makeup tank 21. The velocity of flow in these settling tanks 29, 30 and 31 is low, and, therefore, allows additional solid particles, that may be in the solution drained from the sump 24, to settle out in the bottom of tanks 29, 30 and 31, which may be replaced quickly for cleaning purposes.

The makeup tank 21 is equipped with a drain pipe 32 having a valve 33 therein by which the entire apparatus may be drained and which is to be adjusted to continuously drain a small amount of the solution in the makeup tank 21, which amount is replenished by fresh water from a service water-line 34. The liquid level in the makeup tank 21 is maintained by a float valve 35 in the tank 21 and controls a supply valve 36 in the service water-line 34.

The treating solution in the makeup tank 21 is heated to maintain its proper processing temperature of 80° C. in the treating tank 15 and is accomplished by disposing a pipe 37 in the bottom portion of the makeup tank 21 and provided with a spaced series of orifices or jet nozzles 37a. One end of the pipe 37 is connected to a source of steam supply 39 through a manually controlled valve 38 thus permitting steam to eject through the nozzles 37a to heat the solution and to agitate the solution in the makeup tank 21. The valve 36 is set so as to allow steam to continuously enter the tank 21, but not quite enough in volume to maintain the desired temperature of the solution therein. An automatic temperature regulator 40 is positioned adjacent to tank 21 and has its temperature responsive part 40a disposed in said tank to control a valve 41 in a shunt pipe 37b in the pipe 37 for by-passing the valve 38. Hence, the regulator 40 actuates the valve 41 to override the valve 38 and nicely control and maintain a desired predetermined temperature of the solution in tank 21 so that the solution will be 80° C., more or less, when delivered to the treating tank 15. In practice this temperature has been maintained plus or minus about 2 degrees.

As the corn kernels move or gravitate downwardly through the treating tank 15, the processing temperature is measured by a suitable thermometer 42, which may be a bulb-type measuring instrument or a remote reading thermocouple device to indicate to an attendant that the steam supply should be increased or decreased by operation of the manual valve 38 in order to maintain the proper treating temperature of about 80° C.; or the thermometer means 42 may be connected, as by a thermocouple means not shown, to the actuator 40 of the automatic steam control valve 41 to accomplish the same purpose.

A valve 22a in the supply pipe-line 18 acts as a throttling valve to control the flow from the pump 22, which pump may be shunted by by-pass pipe 18p in pipe-line 18, which by-pass has a manual control valve 43 therein. A flow meter 44 is interposed in the supply pipe 18 downstream with respect to the valve 42 so that a proper flow of the processing solution 17 may be maintained to the treating tank 15, which should be about 20 to 30 gallons per minute for 1000 pounds of corn kernels per hour.

It is preferred to provide the upper end of the treating tank 15 with a lateral outwardly offset annular collection drain 15b rimming said tank 15, into the side wall of which the drain pipe 23 is connected at one or more spaced points to drain the overflow from tank 15 and maintain a constant liquid in said tank.

Since some of the corn kernels do not sink immediately in the treating tank 15 until sufficiently wetted with the treating solution 17, when they will sink slowly and rest upon the top of the kernels in process within the tank, it is provided with a cylindrical sleeve baffle 45, of approximately one-half the diameter of the tank 15, disposed at the top of the treating tank 15 and supported in position thereon, by radial arms 45a, so as to extend above the liquid level in said tank and below said level for a substantial distance as shown. The feeding conveyor 12 discharges into the sleeve-like baffle 45 so that dry corn kernels, which do not sink immediately, cannot float over to the circular drain rim 15b and be drained off. The corn kernels, settling downwardly from the sleeve baffle 45, spread out quite evenly in the treating tank 15 due to the circulation of the treating solution within said tank.

As indicated above, after the treating tank 15 is filled with treating solution 17 from the makeup tank 21 by means of the pump 22, the processing may be started by closing valve 18c, opening valve 18a, opening the gate 11 of hopper 10 and starting the feeding conveyor 12. The extent the gate 11 is opened is related to the speed of the conveyor (driven by the variable speed motor 13) so as to feed the kernels to the treating tank at the required rate that will deliver properly treated kernels to the discharge valve gate 16 of the treating tank 15 at a predetermined amount, or pounds per hour. The maximum capacity of the system is limited according to the capacity of the treating tank 15.

Also, as previously stated, the treating solution 17 from the makeup tank 21 is forced, under pressure from pump 22, upwardly through the mass of kernels which accumulates in the tank 15. After the kernels in the bottom or conical portion 15a of the treating tank 15 have been subjected to the treatment of the treating solution for a proper time—say, between 5 to 7 hours depending upon the character or type of corn kernels being treated—the gate valve 16 is then continuously operated to discharge properly treated kernels from the treating tank, onto the foraminous conveyor 22, at a rate coordinated with the feeding of untreated kernels by the conveyor 12, so that a continuous flow of properly treated kernels will be progressively presented at the discharge gate valve 16 as the mass of accumulated kernels gravitates slowly thereto. This requires special attention in retaining the solution in the treating tank and in avoiding turbulence by the admission of the treating solution into said tank that would destroy the stratae or layers of the kernels in their progressive treatment. In other words the kernels gravitating en mass in the tank should not be subjected to agitation that would cause kernels in various levels in the treating tank to be mixed as this will destroy the effectiveness of the process.

In order to accomplish the last stated result, the frusto-end of the lower conical portion 15a of the treating tank is provided with a relatively short downwardly projecting cylindrical wall 15c having an outwardly extending lateral flange f to which is removably secured a corresponding flange f' of the housing h of the gate valve 16. This wall 15c forms a turbulence reducing chamber a. This cylindrical wall 15c is provided with a plurality of circumferentially spaced tangentially disposed nozzles or orifices n each connected by branch pipes 18f to the supply pipe 18 and arranged to discharge into the chamber a circumferentially thereof (see FIGS. 2 and 3); and each orifice $n$ has the same cross-sectional area as the supply pipe 18 to thereby reduce the velocity of the treating solution entering the chamber $a$. By arranging the orifices $n$ so that the treating solution enters tangentially, the solution ascends in the treating tank 15 somewhat spirally and any stirring of the kernels in process within the tank 15 will tend to be circular and at the same level and since level throughout the treating tank 15 represents processing in time and a different condition of the kernels in that level, a change of position of the kernels from one level to another is to be avoided—hence, kernels once started through the process must not mix.

Figure 3:
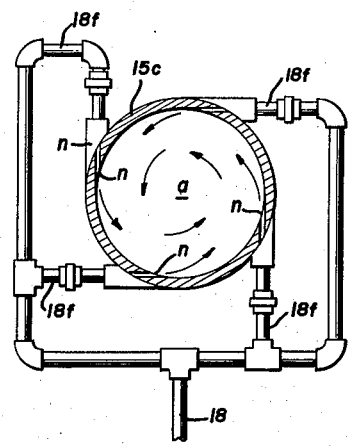
FIGURE 3 is a transverse sectional view taken substantially on line 3—3 of FIGURE 2.
Figure 5:
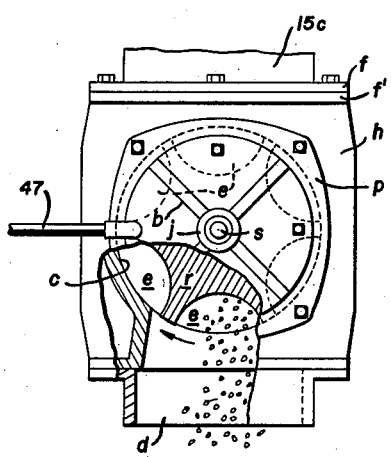
FIGURE 5 is an end elevational view of the gate-valve looking from the left of FIGURE 4.
Figure 4:
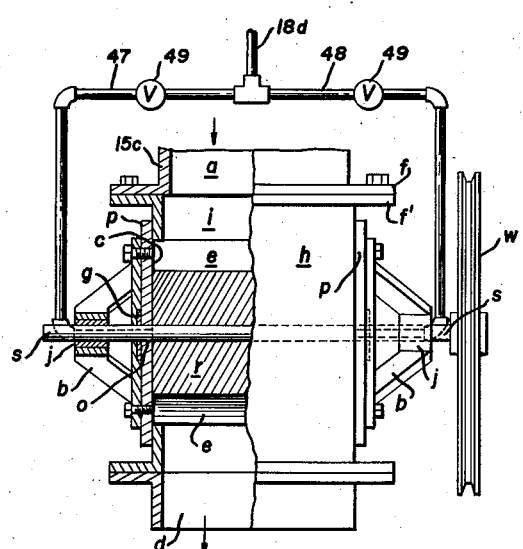
FIGURE 4 is an elevational view of the gate-valve and looking from the left of FIGURE 2 and shown partly in section.

The gate valve 16 comprises, as shown in FIGS. 2, 4, and 5, a housing $h$ having a horizontally extending cylindrical chamber $c$ closed at each end by end plate $p$ having axially aligned openings $o$ therein through which a shaft $s$ rotatably extends and is journalled in bearings $j$ mounted in spider brackets $b$ carried on the outer faces of the end plates $p$. A sealing gland $g$ is carried at or in the openings $o$ to prevent leakage of the treating solution therethrough. A rotor $r$ completely fills the chamber $c$ in the housing $h$ and is fast upon the shaft $s$. The rotor is formed with a plurality of cavities $e$ (preferably about six in number) equally spaced around its periphery and extending axially of the rotor. The housing $h$ has a flanged inlet passage $i$ and an outlet passage $d$ disposed at its opposite sides, respectively, and opposing the periphery of the rotor $r$, the flange $f'$ at the passage $i$ underlying the chamber $a$ and being connected with the rim flange $f$ at the lower end of the cylindrical wall 15c.

The shaft $s$ has a pulley wheel $w$ keyed thereon driven from a variable speed motor 46 by belt $t$. Thus, the motor 46 continuously rotates the valving rotor $r$ to successively present one, or possibly two, of its cavities $e$ under the chamber $a$ (FIGS. 4 and 5) which cavities become filled with the kernels, gravitating from the treating tank 15 into the inlet passage $i$ of the gate housing $h$, and are then carried by the rotor to the outlet passage $d$ and discharged by gravity onto the foraminous conveyor belt 19.

Since the rotary gate valve 16, due to its design and construction, allows a small leakage of the treating solution continually between the rotor $r$ and the housing $h$, this liquid helps to wash said internal cavities $e$ clean of treated kernels, when they are aligned with the discharge passage $d$; and, since air displaces the treating solution in the discharging cavities $e$, as they continue to rotate up toward the inlet passage $i$, it is important to this process to prevent air from entering the treating tank 15 as bubbling air will mix the corn kernels under treatment, which, as stated above, is to be avoided particularly in that portion of the treating tank above its conical bottom 15a.

This is accomplished, as shown in FIGS. 1, 2 and 4, by providing a branch pipe 18d controlled by valve 18e and connected with supply pipe 18 at one of its ends and at its other end to rotor chamber within the housing $h$ by means to extension pipes 47 and 48 each having a valve 49, respectively, therein. These extension pipes 47 and 48 communicate with the interior of the housing $h$ through the end plates $p$, respectively, and are arranged to discharge treating solution into the ends of cavities $e$ of the rotor after they have moved upwardly from the kernel discharge passage toward the kernel inlet passage $i$ of the housing, thus replacing the air in said cavities before they reach the inlet passage $i$—hence, preventing air bubbling in the tank 15. The valves 49 may be adjusted to allow just sufficient flow of the treating solution into the cavities $e$ to accomplish this requirement so that no turbulence is caused that will mix the kernels, in process, in the tank 15.

The volume of corn kernels in the discharging cavities $e$ and the speed of rotation of the rotor $r$ determines the rate of discharge of the treated kernels from the tank 15. While the speed of the feeding motor 13 and the discharge motor 46 may be nicely adjusted manually to coordinate the feeding with the discharge of the kernels to produce a continuous uninterrupted treating of the corn kernels in the tank 15, means are available and known by which their operation may be coordinated and which may be employed in this apparatus.

The washer 20 is of a conventional type used to remove the hulls of corn kernels that have been softened and loosened during the treatment in treating tank 15. It serves also to wash away any of the treating solution adhering to the kernels and to reduce the temperature of the nixtamal below 100 degrees F. so that it may be readily milled into masa. The washer 20 has a hopper 50 which receives the nixtamal from the stainless steel wire conveyor 19 and is connected to a service water main 51 by branch pipe 52 each having a flow adjusting valve 53 therein and arranged to wash the nixtamal into the hopper 50 and to jet spray the nixtamal in a cylindrical tumble-screen 54 supported on rollers 55 and rotated by a motor 56. An auger 57 is connected to the front end of the screen 54 and the water jets cause the hulls to be removed from the kernel. The spent wash water, the hulls and other waste material are collected in a tank 58 underlying the screen 54 and drained off by waste-pipe 59.

Figure 6:
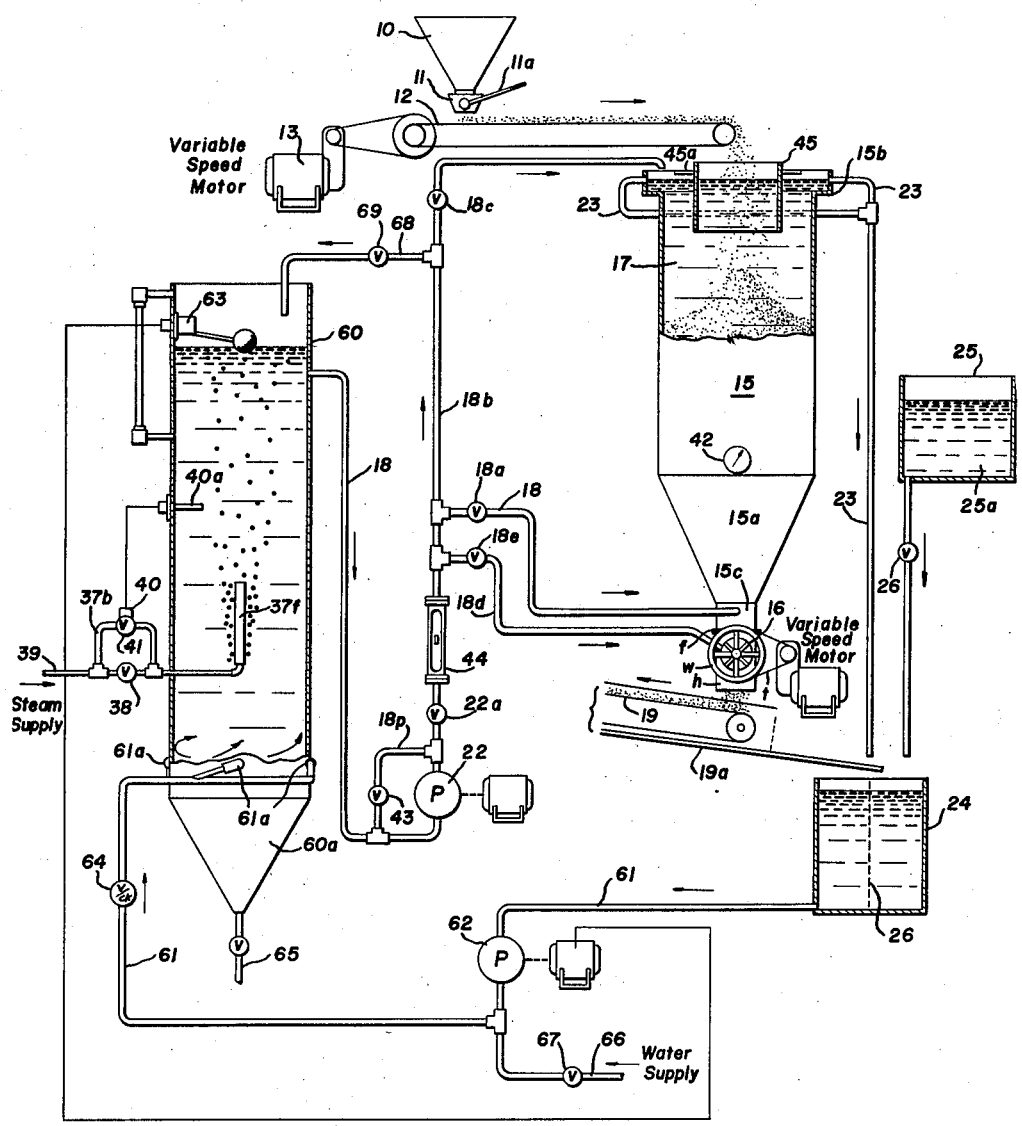
FIGURE 6 is a schematic illustration of another or modified arrangement of instrumentalities for producing nixtamal according to this invention.

In FIGURE 6, the same apparatus is shown as in FIGURE 1, except that a modified makeup tank 60 is illustrated which may be employed instead of the makeup tank 21, and the same reference characters are employed except for the modified parts. Since the makeup tank 60 is a vertical enclosed tank, it takes less floor space, is more sanitary and operates as a more efficient separator for solid material in the treating solution; however, it performs the same function as the horizontal makeup tank 21 in FIGURE 1. The bottom portion of the makeup tank 60 is connected to the sump 24 by a pipe-line 61 (the equivalent of pipe 27 in FIG. 1), which pipe has a pump 62 interposed therein and controlled by a float actuated switch 63 disposed at the top of tank 60 to maintain the level of the treating solution in said tank. A check valve 64 is disposed in the pipe line 61 on the discharge side of the pump 62 to prevent treating solution from draining through the pump back into the sump 24. The discharge end of pipe line 61 enters the tank 60 tangentially above a lower inverted conical portion 60a to cause the solution in the tank to circulate with a velocity which is highest adjacent the side wall of the tank and diminishing to zero at the center, resulting in any solid particles dropping out of the solution near the vertical center of the tank 60 and settling to its conical bottom portion 60a to be drained out periodically through valved-drain pipe 65. The solution and solid materials, so drained, may be dewatered, yielding a recovery from the waste products which has a value.

The treatment solution from the makeup tank 60 is conveyed from the upper portion of said tank, below the liquid level therein, to the treating tank 15 by the supply 18 in the same manner as described and shown in connection with FIG. 1. Additional water may be supplied to the makeup tank 60 by introducing it from a service pipe-line 66, through valve 67, into the pipeline 61 at a point downstream with respect to the pump 62 so as to enter the tank 60 in the manner described above. As in connection with the makeup tank 21 in FIG. 1, the treating solution in makeup tank 60 (in FIG. 6) is heated to the required degree so as to be delivered to the treating tank 15 at about 80° C.; and substantially the same means is employed as in FIG. 1 and is shown as bearing the same reference numerals, except that the perforated steam pipe 37x may be centrally and vertically disposed in the tank 60 substantially as shown in FIGURE 6. Also, in this form of the makeup tank 60, a by-pass pipe 68, having a manual control valve 69 therein, is connected to supply pipe line 18b on the discharge side of pump 22 and discharges into the top of makeup tank 60.

By processing corn kernels according to the above described system, a better nixtamal is produced in a continuous flow for mass production in much less time than heretofore and with the proper moisture content and with all the characteristics desired for tortillas, tortilla flour and more especially for corn-chips; yet avoiding all the disadvantages of prior practices, as the corn kernels and the aqueous treating solution are held at a constant temperature by the constant inflow of fresh treating solution for a sufficient amount of time to allow the hulls to become loosened to allow the proper amount of gelatinization to be formed by hydrolyzation of their constituent materials and to allow the correct amount of water to be evenly absorbed in the remaining starch of the kernels.

Having described the invention and the manner of performing the same, it is to be understood that changes and modifications may be made in the exact steps herein recited as well as in details of construction and arrangement of the parts of the apparatus described and shown and that such changes as fall within the scope of the appended claims are within the purview of the present invention and contemplated thereby.

That which is claimed, as new and to be secured by Letters Patent, is:

1. A continuous method of producing nixtamal comprising: feeding corn kernels at a controlled rate into an aqueous treating bath having an alkalinity of at least 10 pH and a temperature of about 80° C., forming an accumulated mass of corn kernels in said bath which gravitates through the bath; causing said alkaline bath to pass through said mass and progressively subjecting said gravitating corn kernels to the action of said bath; and progressively discharging from said alkaline bath corn kernels which have been exposed to the bath for at least about five hours.

2. A method of producing nixtamal as defined in claim 1 wherein said alkaline solution contains calcium hydroxide in sufficient quantity to provide a pH of 11–12.4.

3. A method of producing nixtamal as defined in claim 1 further comprising: discharging the liquid of said treating bath and reconstructing said liquid by adding alkaline material so that the pH thereof is in excess of 10, and heating said treating bath to about 80° C., plus or minus about 2° C.; and recirculating said reconstructed and reheated treating liquid through said mass of corn kernels.

4. A continuous method of producing nixtamal as defined in claim 1 wherein said corn kernels are discharged from said bath with an absorbed moisture content of at least about 50%.

5. A continuous method of producing nixtamal as defined in claim 1 wherein said bath is passed through said mass of corn kernels at the rate of about 20–30 gallons per minute per 1000 pounds of corn kernels per hour gravitating through said bath.

6. A continuous method of producing nixtamal as defined in claim 1 comprising: washing with water corn kernels discharged from said bath to remove outer hulls and excess alkaline solution so that the pH of the corn is reduced to about 7.

7. A continuous method of producing nixtamal as defined in claim 1 wherein the corn kernels progressively discharged from the bath have been exposed to said alkaline bath for about 5–7 hours according to the characteristics of the corn kernels being treated.

8. A method of producing nixtamal comprising: feeding corn kernels at a controlled rate into a receptacle containing an aqueous solution having an alkalinity of at least 10 pH and a temperature of at least about 80° C., forming an accumulated mass of corn kernels in strata which progressively gravitate through said alkaline solution in substantially vertical direction along the receptacle's vertical axis; causing said alkaline solution to move upwardly through said mass of corn kernels without agitation and progressively subjecting strata of said gravitating corn kernels to the action of said alkaline solution; progressively discharging from said alkaline solution lower strata of corn kernels which have been exposed to said alkaline solution a sufficient time so that the discharged kernels have an absorbed moisture content of at least about 50%; and feeding said alkaline solution of at least 10 pH into said receptacle adjacent the bottom thereof in a plane substantially perpendicular to the vertical axis of the receptacle thereby minimizing change of position of corn kernels in said strata as said alkaline solution is passed upwardly through said gravitating mass of corn kernels.

9. A method of producing nixtamal comprising: feeding corn kernels at a controlled rate into a receptacle containing an aqueous solution having an alkalinity of at least 10 pH and a temperature of at least about 80° C., forming an accumulated mass of corn kernels in strata which progressively gravitate through said alkaline solution; causing said alkaline solution to move upwardly through said mass of corn kernels without agitation and progressively subjecting strata of said gravitating corn kernels to the action of said alkaline solution lower strata of corn kernels which have been exposed to said alkaline solution a sufficient time so that the discharged kernels have an absorbed moisture content of at least about 50%; and feeding said alkaline solution of at least 10 pH into the lower portion of said receptacle as corn kernels are discharged therefrom to avoid entry of air into said receptacle and mixing of air with said mass of gravitating corn kernels.

10. A method of producing nixtamal comprising: feeding corn kernels at a controlled rate into an aqueous solution having an alkalinity of at least 10 pH and a temperature of at least about 80° C., forming an accumulated mass of corn kernels in strata which progressively gravitate through said alkaline solution; causing said alkaline solution to move upwardly through said mass of corn kernels without agitation and progressively subjecting strata of said gravitating corn kernels to the action of said alkaline solution lower strata of corn kernels which have been exposed to said alkaline solution a sufficient time so that the discharged kernels have an absorbed moisture content of at least about 50%; said alkaline solution being passed through said mass of corn kernels at the rate of about 20–30 gallons per minute for 1,000 pounds of corn kernels per hour.

References Cited by the Examiner

UNITED STATES PATENTS

| | | | |
|---|---|---|---|
| 2,498,573 | 2/50 | Ozai-Durrani | 99—80 |
| 2,571,555 | 10/51 | Fernandes | 99—237 |
| 2,584,893 | 2/52 | Floyd et al. | 99—93 |
| 2,638,837 | 5/53 | Talmey et al. | 99—237 |
| 2,704,257 | 3/55 | De Sollano et al. | 99—93 |
| 2,909,114 | 10/59 | Bok | 99—237 |
| 2,964,408 | 12/60 | Gates | 99—80 |

OTHER REFERENCES

"Food Engineering," April 1951, pages 154–157.

A LOUIS MONACELL, *Primary Examiner.*

ABRAHAM H. WINKELSTEIN, *Examiner.*